(12) United States Patent
Motokawa et al.

(10) Patent No.: US 10,828,542 B2
(45) Date of Patent: *Nov. 10, 2020

(54) GOLF CLUB HEAD

(71) Applicant: Sumitomo Rubber Industries, Ltd., Hyogo (JP)

(72) Inventors: Yuki Motokawa, Kobe (JP); Seiji Hayase, Kobe (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/570,929

(22) Filed: Sep. 13, 2019

(65) Prior Publication Data

US 2020/0086186 A1    Mar. 19, 2020

(30) Foreign Application Priority Data

Sep. 18, 2018   (JP) .................. 2018-173257

(51) Int. Cl.
| | |
|---|---|
| A63B 53/04 | (2015.01) |
| B29C 70/20 | (2006.01) |
| B29C 65/48 | (2006.01) |
| B29C 65/00 | (2006.01) |
| B29K 705/08 | (2006.01) |

(Continued)

(52) U.S. Cl.
CPC .......... *A63B 53/0466* (2013.01); *B29C 65/48* (2013.01); *B29C 66/721* (2013.01); *B29C 66/742* (2013.01); *B29C 70/20* (2013.01); *A63B 53/04* (2013.01); *A63B 53/0408* (2020.08); *A63B 53/0412* (2020.08); *A63B 53/0433* (2020.08); *A63B 53/0437* (2020.08); *A63B 60/54* (2015.10); *A63B 2209/00* (2013.01); *A63B 2209/02* (2013.01); *A63B 2209/023* (2013.01); *B29K 2063/00* (2013.01); *B29K 2307/04* (2013.01); *B29K 2705/08* (2013.01); *B29L 2031/5227* (2013.01)

(58) Field of Classification Search
CPC ..... A63B 53/04; A63B 53/0466; A63B 60/54; A63B 2053/0408; A63B 2053/0412; A63B 2053/0433; A63B 2053/0437; A63B 2209/02; A63B 2209/00
USPC ........ 473/332, 343, 344, 345, 347, 348, 349
See application file for complete search history.

(56) References Cited

U.S. PATENT DOCUMENTS

| | | |
|---|---|---|
| 2003/0134692 A1 | 7/2003 | Nakahara et al. |
| 2005/0026723 A1* | 2/2005 | Kumamoto ............ A63B 53/04 473/345 |

(Continued)

*Primary Examiner* — Benjamin Layno
(74) *Attorney, Agent, or Firm* — Studebaker & Brackett PC

(57) ABSTRACT

A golf club head includes a striking face, a crown and a sole. The crown and/or the sole includes an FRP member formed by a fiber reinforced plastic that contains a fiber and a matrix resin. The head has one or more characteristic mode shapes each having a natural frequency of 3000 Hz or greater and 5000 Hz or less. Of the one or more characteristic mode shapes, one characteristic mode shape that has a largest amplitude of a center of figure of the FRP member is defined as a specific characteristic mode shape, the specific characteristic mode shape has a frequency that is defined as a specific modal frequency, and the specific modal frequency has a modal damping ratio that is defined as a specific modal damping ratio. The specific modal damping ratio of the head is less than or equal to 0.6%.

14 Claims, 10 Drawing Sheets

(51) Int. Cl.
  *B29K 63/00* (2006.01)
  *B29K 307/04* (2006.01)
  *B29L 31/52* (2006.01)
  *A63B 60/54* (2015.01)

(56) References Cited

U.S. PATENT DOCUMENTS

| | | | |
|---|---|---|---|
| 2006/0052185 A1* | 3/2006 | Kawaguchi | A63B 53/0466 473/349 |
| 2007/0196648 A1* | 8/2007 | Endo | A63B 53/10 428/367 |
| 2012/0278048 A1* | 11/2012 | Hayase | A63B 71/081 703/1 |
| 2015/0360092 A1 | 12/2015 | Nakamura | |
| 2016/0001146 A1* | 1/2016 | Sargent | A63B 60/04 473/336 |
| 2017/0259138 A1 | 9/2017 | Nakamura | |
| 2018/0036612 A1 | 2/2018 | Takeuchi | |

* cited by examiner

GOLF CLUB HEAD

The present application claims priority on Patent Application No. 2018-173257 filed in JAPAN on Sep. 18, 2018. The entire contents of this Japanese Patent Application are hereby incorporated by reference.

BACKGROUND OF THE INVENTION

Field of the Invention

The present disclosure relates to a golf club head.

Description of the Related Art

There has been known a golf club head including a crown that is formed by using a fiber reinforced plastic (FRP). The use of an FRP can improve the degree of freedom in design of the head.

SUMMARY OF THE INVENTION

As compared with a head formed by only a metal, a head formed by using an FRP is difficult to attain a good sound at impact. For many golf players, a sound at impact is more than a matter of mere preference. The sound at impact can affect evaluation on the shot. The sound at impact can have an effect on the golf player's state of mind. The sound at impact can influence the swing.

A long duration (period of time during which a sound continues) of a sound is perceived as a long-lasting reverberation of the sound, which is recognized as a good sound at impact. The present disclosure provides a head that includes an FRP member and has an excellent long duration of sound at impact.

According to one aspect, a golf club head includes a striking face, a crown, and a sole. The crown and/or the sole includes an FRP member that is formed by a fiber reinforced plastic containing a fiber and a matrix resin. The head has one or more characteristic mode shapes each having a natural frequency of greater than or equal to 3000 Hz and less than or equal to 5000 Hz. Of the one or more characteristic mode shapes, one characteristic mode shape that has a largest amplitude of a center of figure of the FRP member is defined as a specific characteristic mode shape, the specific characteristic mode shape has a frequency that is defined as a specific modal frequency, the specific modal frequency has a modal damping ratio that is defined as a specific modal damping ratio, and the specific modal damping ratio is less than or equal to 0.6%.

DESCRIPTION OF THE PREFERRED EMBODIMENTS

The following will describe embodiments in detail with appropriate reference to the drawings.

Figure 1:
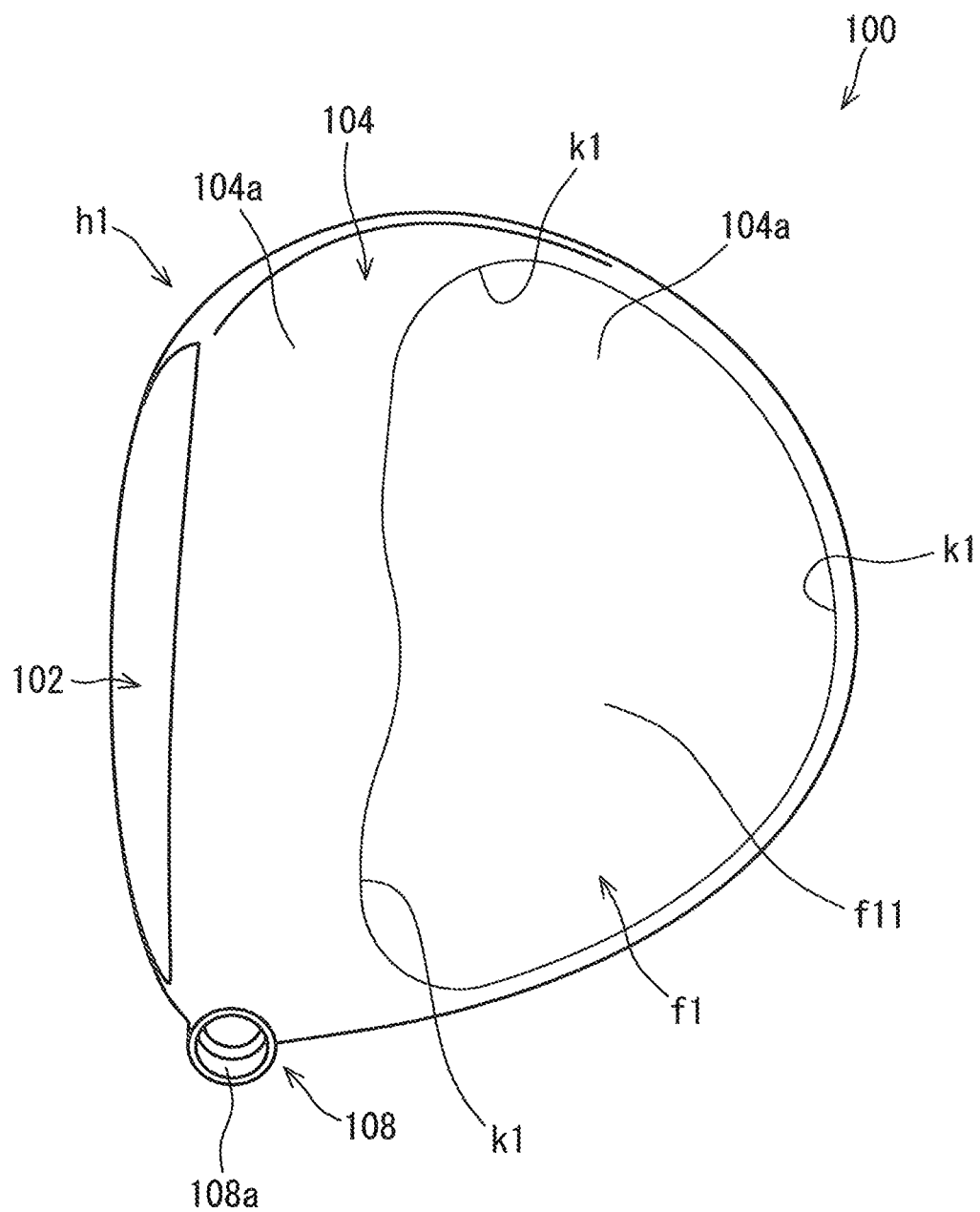
FIG. 1 is a plan view of a golf club head according to a first embodiment.
Figure 2:
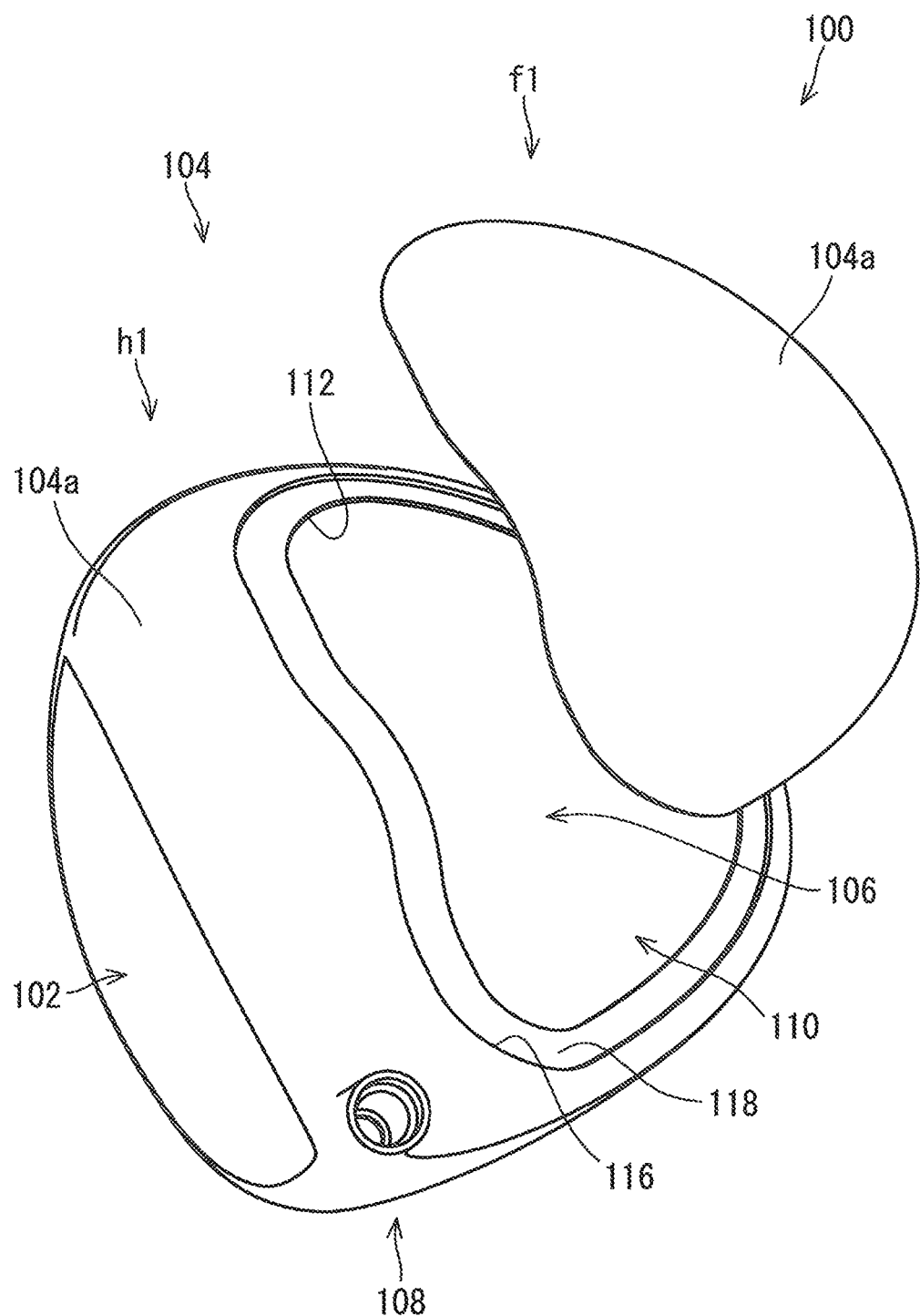
FIG. 2 is an exploded perspective view of the head in FIG. 1.
Figure 3:
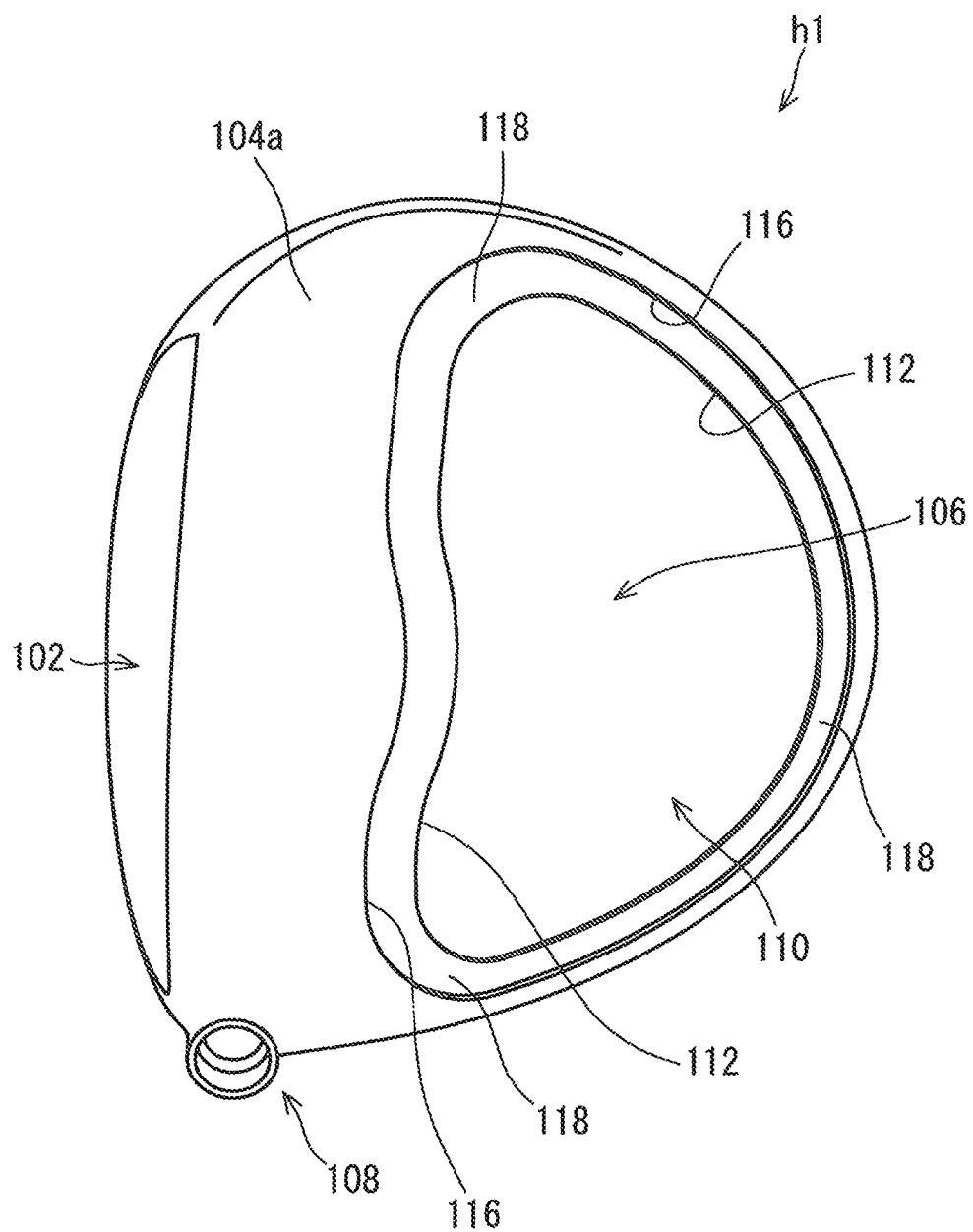
FIG. 3 is a plan view of a head body of the head in FIG. 1.
Figure 4:
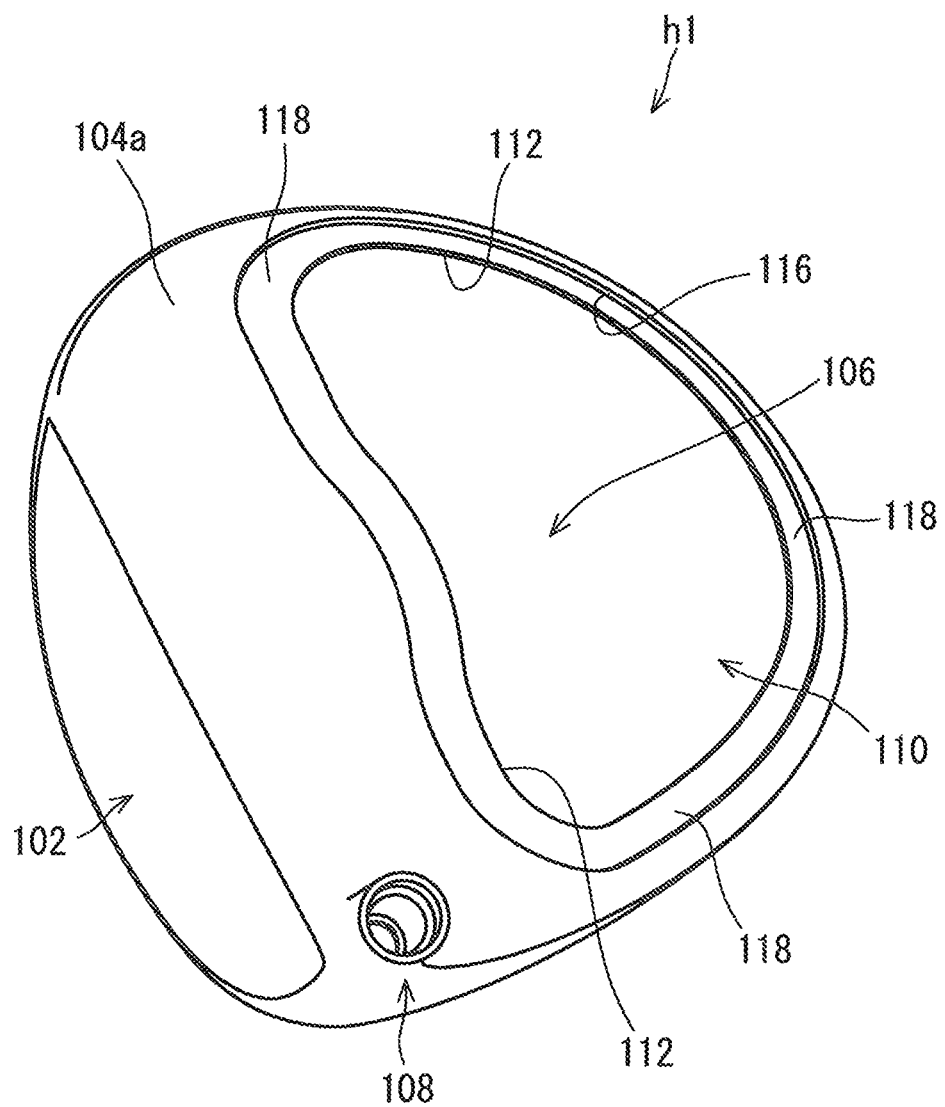
FIG. 4 is a perspective view of the head body in FIG. 3.

FIG. 1 is a plan view of a head 100 according to a first embodiment as viewed from a crown side. FIG. 2 is an exploded perspective view of the head 100. FIG. 3 is a plan view of a head body h1 as viewed from the crown side. FIG. 4 is a perspective view of the head body h1.

The head 100 includes a striking face 102, a crown 104, a sole 106, and a hosel 108. The hosel 108 includes a hosel hole 108a. The head 100 is a wood type golf club head. The inside of the head 100 is an empty space. That is, the head 100 is hollow. In the present embodiment, the hosel hole 108a has a centerline that is a shaft axis line Z (described later).

As well shown in FIG. 2, the head 100 includes the head body h1 and an FRP member f1. The head body h1 includes the whole striking face 102. The head body h1 includes a part of the crown 104. The head body h1 includes the whole sole 106. The head body h1 includes the whole hosel 108.

The head body h1 forms portions except the FRP member f1. The head body h1 is made of a metal. The head body h1 may be formed by a single member that is integrally formed. Alternatively, the head body h1 may be formed by joining two or more members to each other.

The crown 104 includes an outer surface 104a. The head body h1 includes a part of the crown outer surface 104a. The FRP member f1 includes a part of the crown outer surface 104a. The crown outer surface 104a is constituted by the head body h1 and the FRP member f1.

The head body h1 includes an opening 110. The opening 110 includes a contour 112. The contour 112 is an edge of the head body h1. The opening 110 penetrates through the head 100 from the outside to the inside of the head 100. In other words, the opening 110 penetrates through the head 100 from the outside to the hollow portion of the head 100.

The opening 110 is provided on the crown 104. The opening 110 can be provided at a location that corresponds to the location of the FRP member f1. For example, when the FRP member f1 is provided on the sole 106, the opening 110 can also be provided on the sole 106. For example, when the FRP member f1 is provided so as to extend from the sole 106 into the crown 104, the opening 110 can also be provided so as to extend from the sole 106 into the crown 104.

The head body h1 includes the crown outer surface 104a which forms the surface of the crown 104, a stepped portion 116, and a support portion 118. The stepped portion 116 has a shape that corresponds to the shape of the contour of the FRP member f1. The stepped portion 116 is formed to coincide with the peripheral edge of the FRP member f1. The stepped portion 116 has a height that corresponds to the thickness of the peripheral edge of the FRP member f1. The crown outer surface 104a has no step on a boundary k1 between the head body h1 and the FRP member f1. Note that the boundary k1 is not visually recognized in the finished-product head 100 which has been subjected to surface treatment such as painting.

The support portion 118 abuts against the inner surface of the FRP member f1. The support portion 118 supports the FRP member f1 from the inside of the head 100. The head body h1 is joined to the FRP member f1 on the support portion 118. The method of this joining is adhesion with an adhesive.

The FRP member f1 has a plate-like shape as a whole. The FRP member f1 is curved so as to project toward the outside of the head 100. The outer surface of the FRP member f1 constitutes the crown outer surface 104*a*. The FRP member f1 has a constant thickness. Alternatively, the FRP member f1 may have an inconstant thickness.

Of the FRP member f1, a portion located inside the contour 112 of the opening 110 is not supported by the support portion 118 of the head body h1. Of the crown 104, the portion located inside the contour 112 of the opening 110 is formed by only the FRP member f1. This portion formed by only the FRP member f1 is also referred to as an FRP alone portion. The FRP member f1 includes an FRP alone portion f11. A central portion of the FRP member f1 is the FRP alone portion f11. The outer surface of the FRP alone portion f11 constitutes the crown outer surface 104*a*. The inner surface of the FRP alone portion f11 faces the hollow portion of the head 100. The peripheral edge of the FRP member f1 is glued to the support portion 118. Preferably, two test pieces for measuring an average flexural modulus (detailed later) are cut out from the FRP alone portion f11.

The FRP member f1 is formed by only a fiber reinforced resin. The FRP member f1 has a specific gravity different from the specific gravity of the head body h1. The specific gravity of the FRP member f1 is smaller than the specific gravity of the head body h1. The FRP member f1 enhances the degree of freedom in location of the center of gravity of the head 100. The FRP member f1 contributes to lowering of the center of gravity of the head 100. The FRP member f1 enhances the degree of freedom in weight distribution of the head 100. The FRP member f1 contributes to increase of the moment of inertia of the head 100. A resin in the present application means a concept including resin compositions.

The structure and manufacturing method of the FRP member f1 are not limited. The FRP member f1 is preferably formed by one or more prepregs. In the present embodiment, the FRP member f1 is formed by laminated prepregs. The prepregs are not limited. Examples of the prepregs include a UD prepreg and a prepreg in which fibers are woven. The prepreg in which fibers are woven is also referred to as a woven prepreg. In the UD prepreg, fibers are oriented in one direction. The term UD stands for unidirectional. The UD prepreg is used in the present embodiment. The FRP member f1 may include a layer formed by a prepreg that is not the UD prepreg. For example, the FRP member f1 may include a woven layer. The woven layer means a layer formed by the woven prepreg.

The FRP member f1 in the present embodiment is formed by a plurality of UD prepregs laminated on each other. Cut prepregs are laminated in the FRP member f1. The FRP member f1 includes a plurality of layers. One prepreg forms one layer.

The FRP member f1 in the present embodiment includes two layers, respective fibers of which are oriented at different angles from each other. The FRP member f1 includes a layer having a fiber-orientation angle $\theta$ of a first angle $\theta 1$, and a layer having a fiber-orientation angle $\theta$ of a second angle $\theta 2$. The FRP member f1 includes the two layers having different fiber-orientation angles, which enables to reduce anisotropy of the FRP member f1. By enhancing rigidities in different bending directions, sound at impact can be improved.

Figure 9A:
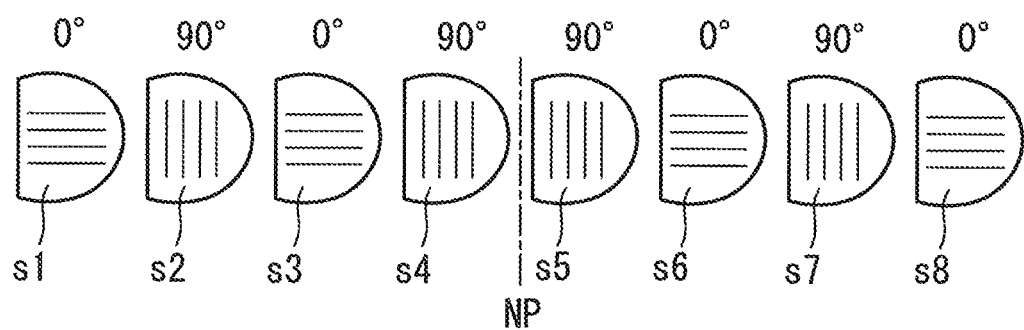
FIG. 9A and FIG. 9B show laminated constitutions in Examples.
Figure 9B:
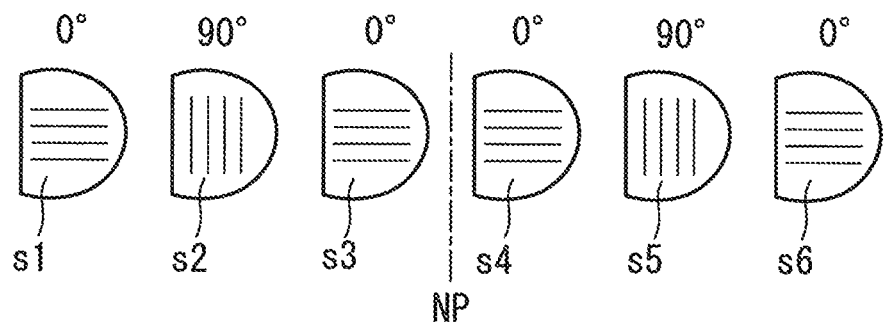

FIG. 5A, FIG. 5B, FIG. 5C, and FIG. 5D show examples of the laminated constitution of the FRP member f1. FIG. 9A and FIG. 9B described later show laminated constitutions in Examples. These diagrams schematically show prepregs constituting the FRP member f1 with D shapes. These prepregs are actually cut out into a shape that corresponds to the contour shape of the FRP member f1. One prepreg forms one layer. These prepregs are laminated and subjected to thermoforming process using a mold to obtain the FRP member f1 constituted by the plurality of layers.

Figure 5A:
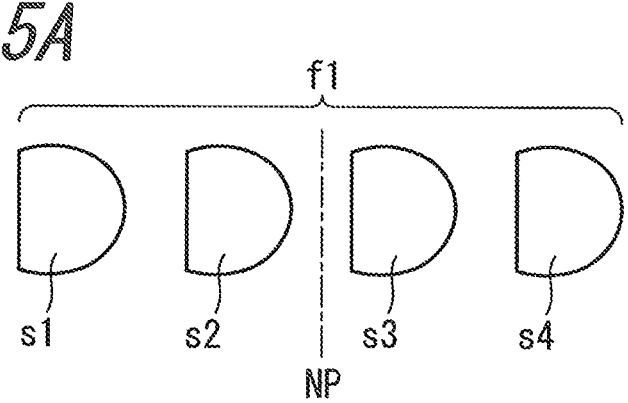
FIG. 5A, FIG. 5B, FIG. 5C and FIG. 5D show examples of a laminated constitution of an FRP member.
Figure 5B:
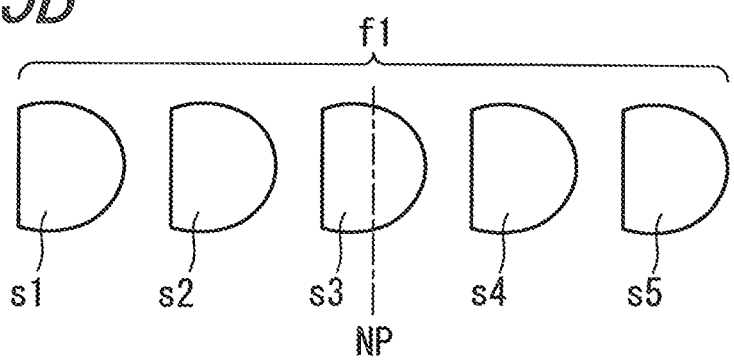
Figure 5C:
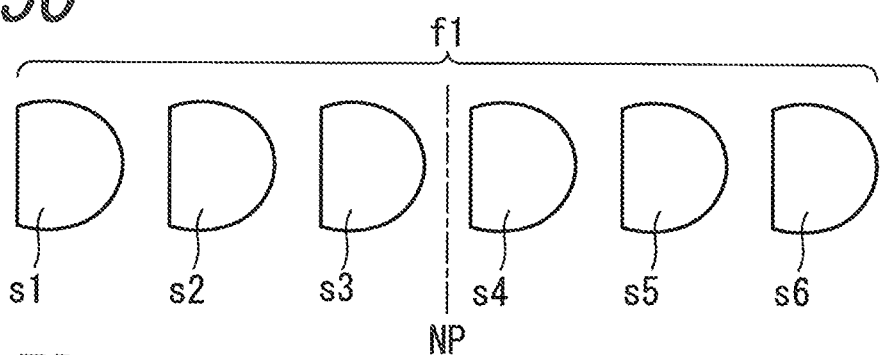
Figure 5D:
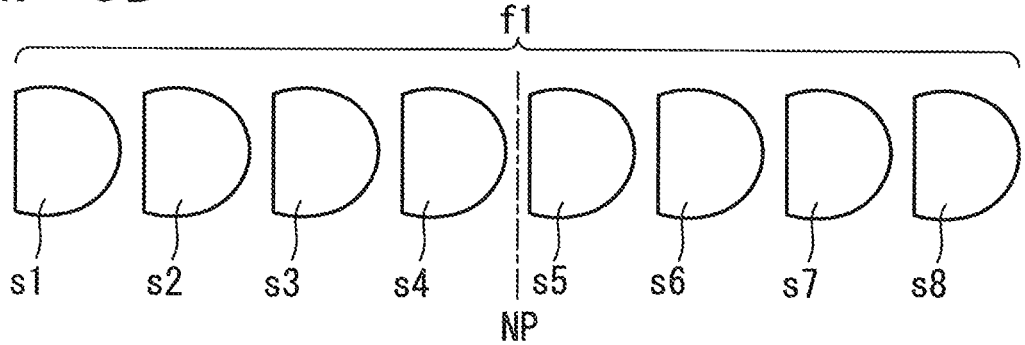

In the embodiment of FIG. 5A, the number N of the layers of the FRP member f1 is four. These four layers are termed a first layer s1, a second layer s2, a third layer s3, and a fourth layer s4 in order from inside. The first layer s1 is the innermost layer. The fourth layer s4 is the outermost layer. In the embodiment of FIG. 5B, the number N of the layers of the FRP member f1 is five. These five layers are termed a first layer s1, a second layer s2, a third layer s3, a fourth layer s4, and a fifth layer s5 in order from inside. The first layer s1 is the innermost layer. The fifth layer s5 is the outermost layer. In the embodiment of FIG. 5C, the number N of the layers of the FRP member f1 is six. These six layers are termed a first layer s1, a second layer s2, a third layer s3, a fourth layer s4, a fifth layer s5, and a sixth layer s6 in order from inside. The first layer s1 is the innermost layer. The sixth layer s6 is the outermost layer. In the embodiment of FIG. 5D, the number N of the layers of the FRP member f1 is eight. These eight layers are termed a first layer s1, a second layer s2, a third layer s3, a fourth layer s4, a fifth layer s5, a sixth layer s6, a seventh layer s7, and an eighth layer s8 in order from inside. The first layer s1 is the innermost layer. The eighth layer s8 is the outermost layer. In these embodiments, all the layers are UD layers formed by UD prepregs.

The number of the layers of the FRP member f1 is not limited. From the standpoint of strength and reduction of the anisotropy, the number of the layers of the FRP member f1 is preferably greater than or equal to 2, more preferably greater than or equal to 3, and still more preferably greater than or equal to 4. From the standpoint of weight reduction and productivity, the number of the layers of the FRP member f1 is preferably less than or equal to 10, more preferably less than or equal to 9, and still more preferably less than or equal to 8.

The laminated constitution of the FRP member f1 may have a lamination symmetric property. The lamination symmetric property in the present application means that an n-th outer layer counting from a neutral surface and an n-th inner layer counting from the neutral surface have a substantially same specification. The "n" is an integer of greater than or equal to 1. The FRP member f1 is formed by laminating the prepregs so that the laminated layers are symmetrical with respect to the neutral surface, thus inhibiting coupling effects such as distortion which might be caused by bending. In addition, the symmetrically laminated layers with respect to the neutral surface facilitate keeping the location of the neutral surface at the center in the thickness direction of the FRP member f1. Therefore, improvement in rigidity (flexural rigidity) of the FRP member f1 is facilitated. The lamination symmetric property can contribute to enhancing the rigidity of the FRP member f1 while controlling its thickness. The FRP member f1 having a high rigidity can contribute to improvement in sound at impact.

The number of the UD-prepreg layers in the FRP member f1 is denoted by N. When N is an even number, the neutral surface means a boundary between a [N/2]-th layer counting from inside and a [(N/2)+1]-th layer counting from inside. When N is an odd number, the neutral surface means [(N/2)+1]-th layer itself counting from inside.

The lamination symmetric property can be defined per specification. Examples of the specifications include a fiber-orientation angle, a layer thickness, the kind of carbon fibers, fiber content, and the kind of prepregs.

Hereinafter, the neutral surface and the lamination symmetric property are specifically explained.

As shown in FIG. 5A, when the number N of the layers of the FRP member f1 is 4, for example, the neutral surface NP is the boundary between the second layer s2 and the third layer s3.

When the embodiment of FIG. 5A satisfies the following (a1) and (a2), this embodiment is defined as having a lamination symmetric property in fiber-orientation angles.

(a1) The fiber-orientation angle of the first layer s1 is substantially equal to the fiber-orientation angle of the fourth layer s4.

(a2) The fiber-orientation angle of the second layer s2 is substantially equal to the fiber-orientation angle of the third layer s3.

The lamination symmetric property in fiber-orientation angles can contribute to improvement in sound at impact.

Note that the term "substantially" used for the fiber-orientation angle means that a margin of error of ±10 degrees (preferably ±5 degrees) is acceptable. Normally, the outer surface of the head 100 is formed with a free-form curved surface, not a flat surface. For this reason, a certain degree of margin of error in the fiber-orientation angle is inevitable.

Similarly, lamination symmetric properties in other specifications are also defined. For example, when the number N of the layers is 4, the FRP member f1 satisfying the following (a3) and (a4) has a lamination symmetric property in layer thicknesses.

(a3) The layer thickness of the first layer s1 is substantially equal to the layer thickness of the fourth layer s4.

(a4) The layer thickness of the second layer s2 is substantially equal to the layer thickness of the third layer s3.

The lamination symmetric property in layer thicknesses can contribute to improvement in sound at impact.

Note that the term "substantially" used for the layer thickness means that a margin of error of ±10% (preferably ±5%) is acceptable. Normally, some matrix resin fluidizes during the process of forming the FRP member f1. For this reason, a certain degree of margin of error in the layer thickness is inevitable.

Similarly, when the number N of the layers is 4, the FRP member f1 satisfying the following (a5) and (a6) has a lamination symmetric property in kinds of prepregs.

(a5) The kind of prepreg of the first layer s1 is equal to the kind of prepreg of the fourth layer s4.

(a6) The kind of prepreg of the second layer s2 is equal to the kind of prepreg of the third layer s3.

The lamination symmetric property in kinds of prepregs can contribute to improvement in sound at impact.

The kind of prepreg can be determined by a product number of the prepreg.

As shown in FIG. 5B, when the number N of the layers of the FRP member f1 is 5, for example, the neutral surface NP is the third layer s3 itself.

When the embodiment of FIG. 5B satisfies the following (b1) and (b2), this embodiment has a lamination symmetric property in fiber-orientation angles.

(b1) The fiber-orientation angle of the first layer s1 is substantially equal to the fiber-orientation angle of the fifth layer s5.

(b2) The fiber-orientation angle of the second layer s2 is substantially equal to the fiber-orientation angle of the fourth layer s4.

When the number N of the layers is 5, the FRP member f1 satisfying the following (b3) and (b4) has a lamination symmetric property in layer thicknesses.

(b3) The layer thickness of the first layer s1 is substantially equal to the layer thickness of the fifth layer s5.

(b4) The layer thickness of the second layer s2 is substantially equal to the layer thickness of the fourth layer s4.

When the number N of the layers is 5, the FRP member f1 satisfying the following (b5) and (b6) has a lamination symmetric property in kinds of prepregs.

(b5) The kind of prepreg of the first layer s1 is equal to the kind of prepreg of the fifth layer s5.

(b6) The kind of the prepreg of the second layer s2 is equal to the kind of the prepreg of the fourth layer s4.

When N is an even number as shown in FIG. 5C and FIG. 5D, the neutral surface NP and the lamination symmetric properties are defined in the similar manner as in the embodiment of FIG. 5A. In the embodiment of FIG. 5C (N=6), the neutral surface NP is a boundary between the third layer s3 and the fourth layer s4. In the embodiment of FIG. 5D (N=8), the neutral surface NP is a boundary between the fourth layer s4 and the fifth layer s5.

Figure 10:
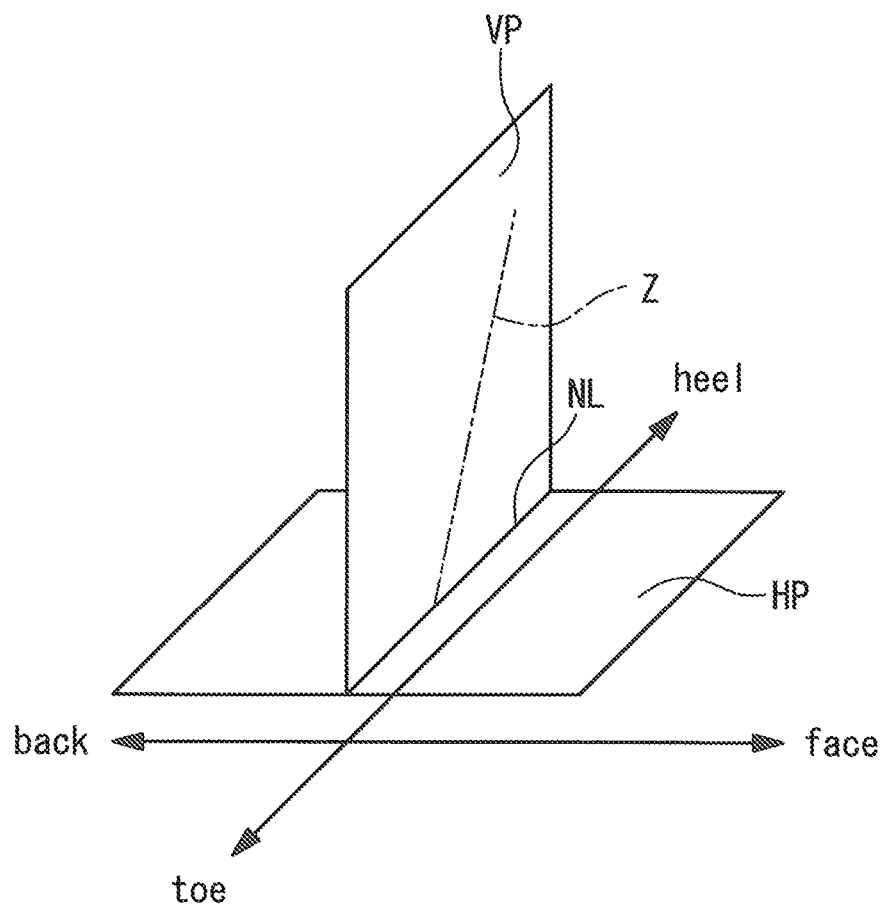
FIG. 10 is a schematic diagram illustrating a toe-heel direction and a face-back direction.

The term "fiber-orientation angle $\theta$" is defined in present application. The fiber-orientation angle $\theta$ is determined by using a face-back direction as 0 degree. The angle $\theta$ is determined on the planar view of the head. The face-back direction is defined as follows. With reference to FIG. 10, a head is placed at a predetermined lie angle and real loft angle on a horizontal plane HP, which is referred to as a reference state, and a perpendicular plane VP that is perpendicular to the horizontal plane HP and includes a shaft axis line Z of the head is determined. The direction of an intersection line NL between the perpendicular plane VP and the horizontal plane HP is defined as a toe-heel direction. A direction that is perpendicular to the toe-heel direction and parallel to the horizontal plane HP is defined as the face-back direction. The predetermined lie angle and real loft angle are shown in a product catalog, for example.

From the standpoint of reducing anisotropy and enhancing rigidity and strength in a plurality of directions, the FRP member f1 may include two kinds of angles $\theta$. That is, the FRP member f1 may include a layer having a fiber-orientation angle $\theta$ of a first angle $\theta 1$, and a layer having a fiber-orientation angle $\theta$ of a second angle $\theta 2$. Moreover, the FRP member f1 may include three kinds of angles $\theta$. That is, the FRP member f1 may include a layer having a fiber-orientation angle $\theta$ of a first angle $\theta 1$, a layer having a fiber-orientation angle $\theta$ of a second angle $\theta 2$, and a layer having a fiber-orientation angle $\theta$ of a third angle $\theta 3$. Moreover, the FRP member f1 may include four or more kinds of angles $\theta$. Examples of the angle $\theta$ include 0 degree, ±30 degrees, ±45 degrees, ±60 degrees, ±75 degrees, and 90 degrees. A margin of error of ±10 degrees (preferably ±5 degrees) is acceptable in the fiber-orientation angle $\theta$.

In a preferable example, the FRP member f1 includes a layer having a fiber-orientation angle $\theta$ of 0 degree (0-degree layer). An impact force applied to the head from a ball at impact acts in the face-back direction. The 0-degree layer is effective in enhancing the rigidity and strength of the FRP member f1 against the impact force. The 0-degree layer can contribute to improvement in sound at impact.

In another preferable example, the FRP member f1 includes a layer (0-degree layer) having a fiber-orientation angle θ of 0 degree, and a layer (90-degree layer) having a fiber-orientation angle θ of 90 degrees. As described above, the 0-degree layer can effectively enhance the rigidity of the FRP member f1 against the impact force. The 90-degree layer can enhance the rigidity of the FRP member f1 in a direction which is difficult to reinforce with the 0-degree layer.

In still another preferable example, the FRP member f1 includes the 0-degree layer and the 90-degree layer, and has the lamination symmetric property in fiber-orientation angles. For example, in the embodiment of FIG. 5A, the first layer s1 and the fourth layer s4 may be the 0-degree layers, and the second layer s2 and the third layer s3 may be the 90-degree layers. For example, in the embodiment of FIG. 5B, the first layer s1 and the fifth layer s5 may be the 0-degree layers, the second layer s2 and the fourth layer s4 may be 90-degree layers. For example, in the embodiment of FIG. 5C, the first layer s1, the third layer s3, the fourth layer s4 and the sixth layer s6 may be the 0-degree layers, and the second layer s2 and the fifth layer s5 may be the 90-degree layers. For example, in the embodiment of FIG. 5D, the first layer s1, the third layer s3, the sixth layer s6, and the eighth layer s8 may be the 0-degree layers, and the second layer s2, the fourth layer s4, the fifth layer s5, and the seventh layer s7 may the 90-degree layers. In these examples, respective outermost layers are the 0-degree layers.

The embodiment of FIG. 5B has the lamination symmetric property in fiber-orientation angles regardless of the fiber-orientation angle θ of the third layer s3. In the embodiment of FIG. 5B, the number N of the layers is an odd number, and thus the neutral surface is the third layer s3 itself. When the number N of the layers is an odd number, specifications of a layer that forms the neutral surface NP do not influence the lamination symmetric property.

As described above, the FRP member f1 may be provided on the sole. A head 200 according to a second embodiment shown in FIG. 6 includes the FRP member f1 provided on the sole.

Figure 6:
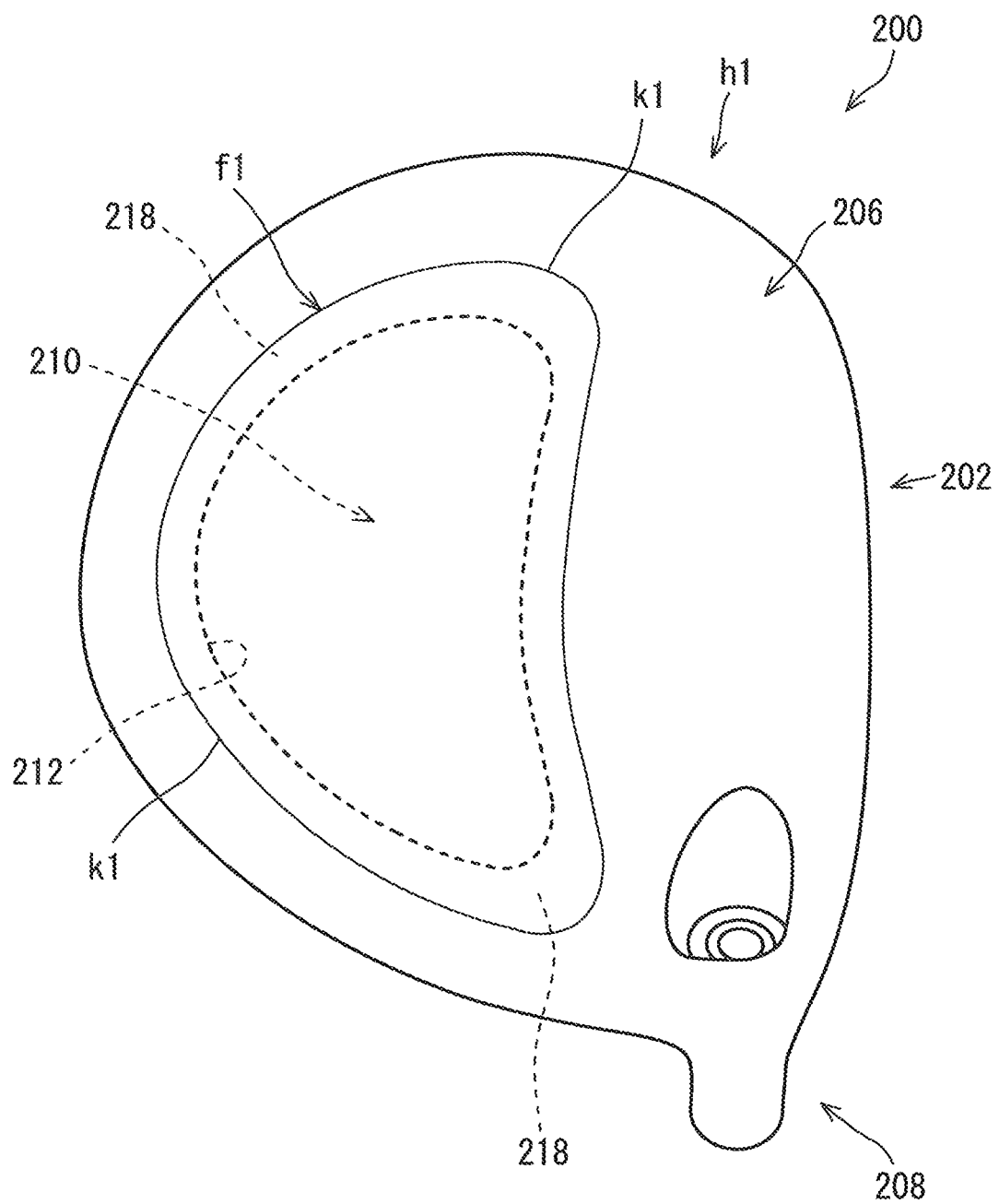
FIG. 6 is a bottom view of a golf club head according to a second embodiment.

FIG. 6 is a bottom view of the head 200 according to the second embodiment as viewed from the sole side. The head 200 includes a striking face 202, a crown (not shown in the drawing), a sole 206, and a hosel 208. The head 200 includes a head body h1 and the FRP member f1. The head body h1 includes the whole striking face 202. The head body h1 includes the whole crown. The head body h1 includes a part of the sole 206. The head body h1 includes the whole hosel 208.

The head body h1 forms portions except the FRP member f1. The head body h1 is made of a metal. The head body h1 includes an opening 210 and a support portion 218. The opening 210 includes a contour 212. The contour 212 is an edge of the head body h1. The opening 210 penetrates through the head 200 from the outside to the inside of the head 200. The opening 210 is provided on the sole 206. The opening 210 is provided at a location that corresponds to the location of the FRP member f1. The support portion 218 is located on the circumference of the opening 210. The support portion 218 supports the FRP member f1 from the inside of the head 200. The support portion 218 abuts against the inner surface of the FRP member f1. The head body h1 is joined to the FRP member f1 on the support portion 218. The method of this joining is adhesion with an adhesive. The FRP member f1 covers the opening 210. The outer surface of the sole 206 has no step on a boundary k1 between the head body h1 and the FRP member f1.

One example of the manufacturing method for the FRP member f1 includes the following steps:

(1) stacking prepregs according to a designed laminated constitution and pressing the stacked prepregs onto each other to obtain laminated sheets;

(2) cutting the laminated sheets into a predetermined-shape to obtain a piece to be molded; and (3) heating and pressurizing the piece to be molded by using a mold to obtain the FRP member.

The matrix resin attenuates sound at impact. From the standpoint of sound at impact, the FRP member f1 has a resin content of preferably less than or equal to 42% by weight, more preferably less than or equal to 40% by weight, still more preferably less than or equal to 35% by weight, and yet still more preferably less than or equal to 30% by weight. From the standpoint of formability, the resin content of the FRP member f1 is preferably greater than or equal to 15% by weight, and more preferably greater than or equal to 20% by weight. When multiple kinds of prepregs are used, the resin content can be calculated by weighted average of respective resin contents of the prepregs. That is, the resin content means the resin content of the whole FRP member f1.

A high glass transition temperature Tg of the matrix resin can suppress the attenuation of sound at impact. From the standpoint of sound at impact, the matrix resin has a glass transition temperature Tg of preferably higher than or equal to 120° C., more preferably higher than or equal to 150° C., still more preferably higher than or equal to 180° C., and yet still more preferably higher than or equal to 200° C. An excessively high glass transition temperature Tg of the matrix resin requires a facility having a high heating capability, or takes longer time for molding, thereby reducing productivity. In addition, a matrix resin having such a high Tg might be difficult to obtain. In these respects, the glass transition temperature Tg of the matrix resin is preferably lower than or equal to 300° C., and more preferably lower than or equal to 280° C. When multiple kinds of prepregs are used, glass transition temperatures Tg of all the prepregs preferably satisfy the above values.

The glass transition temperature of a matrix resin can be measured as follows. In this measurement, a test piece made of a matrix resin to be measured is prepared. This test piece has a length of 55 mm, a width of 12.7 mm, and a thickness of 2 mm. According to ASTM D-7028, a dynamic viscoelasticity measurement device is used to measure a storage modulus E' in flexure mode under conditions of a frequency of 1 Hz and a heating rate of 5° C./min. In a graph made by plotting values of log E' against temperature, a temperature at an intersection point between a tangent line of a flat region before the transition of log E' and a tangent line at an inflection point of a transition region of log E' can be determined as the glass transition temperature.

The fibers (reinforcing fibers) of the FRP member f1 may include a metallic fiber. The metallic fiber can suppress the attenuation of sound at impact. The metallic fiber can contribute to improvement in sound at impact. In this case, the reinforcing fibers preferably include a carbon fiber and a metallic fiber.

Examples of the metallic fiber include an aluminum fiber, a magnesium fiber, a titanium fiber, a nickel fiber, a nickel-titanium alloy fiber (Ni—Ti wire), a copper fiber, a tungsten fiber, a molybdenum fiber, a beryllium fiber, stainless steel fiber, and a boron fiber. The names of these metallic fibers show materials of the fibers. The metallic fiber may contain a different material as a core material in addition to the metal. For example, the boron fiber may be formed by vapor deposition of boron onto the surface of a tungsten wire that is used as the core material. Note that the aluminum fiber is a concept that includes an aluminum alloy fiber. This holds true for other metallic fibers.

As shown in below Examples, the inventors have found that duration of sound at impact is lengthened by decreasing an elastic modulus of the fiber. From the standpoint of lengthening the duration of sound at impact, the carbon fiber preferably has a small tensile elastic modulus. The tensile elastic modulus of the carbon fiber is preferably less than or equal to 330 GPa, more preferably less than or equal to 300 GPa, still more preferably less than 300 GPa, still more preferably less than or equal to 250 GPa, and yet still more preferably less than or equal to 240 GPa. From the standpoint of strength, a PAN-based carbon fiber is preferably used. The tensile elastic modulus of the carbon fiber is preferably greater than or equal to 30 GPa, more preferably greater than or equal to 50 GPa, and still more preferably greater than or equal to 100 GPa. The value of the tensile elastic modulus is obtained by measuring the carbon fiber in accordance with JIS R 7601: 1986 "Testing methods for carbon fiber".

The kind of the matrix resin is not limited. Examples of the matrix resin include a thermoplastic resin and a thermosetting resin. Examples of the thermosetting resin include an unsaturated polyester resin, an epoxy resin, a vinyl ester resin, a bismaleimide resin, a phenol resin, a cyanate resin, and a polyimide resin. Examples of the thermoplastic resin include a nylon resin (PA), a polypropylene resin (PP), a polyphenylene sulfide resin (PPS), a polyether sulfone resin (PES), a polyetherimide resin (PEI), a polycarbonate resin (PC), a polyethylene terephthalate resin (PET), a polyether ketone resin (PEK), a polyether ether ketone resin (PEEK), and a polyether ketone ketone resin (PEKK). From the standpoint of formability and versatility, the epoxy resin is preferable.

From the standpoint of enhancing the degree of freedom in design of the head, the FRP alone portion f11 preferably has a large area (area of the opening 110). When the FRP member f1 is provided on the crown, a ratio Rf of the area of the FRP alone portion f11 to the area of the crown 104 is preferably greater than or equal to 40%, and more preferably greater than or equal to 50%. From the standpoint of sound at impact, the ratio Rf is preferably less than or equal to 90%, and more preferably less than or equal to 80%. The ratio Rf is determined in the plan view as viewed from the crown side.

From the standpoint of enhancing the degree of freedom in design of the head, the FRP member f1 has a weight of preferably less than or equal to 30 g, more preferably less than or equal to 25 g, and still more preferably less than or equal to 20 g. From the standpoint of strength of the FRP member f1, the weight of the FRP member f1 is preferably greater than or equal to 5 g, and more preferably greater than or equal to 10 g.

From the standpoint of enhancing rigidity, the FRP member f1 has a thickness of preferably greater than or equal to 0.4 mm, more preferably greater than or equal to 0.5 mm, and still more preferably greater than or equal to 0.6 mm. From the standpoint of reducing weight, the thickness of the FRP member f1 is preferably less than or equal to 1.5 mm, more preferably less than or equal to 1.2 mm, and still more preferably less than or equal to 1.0 mm. In view of lowering the center of gravity of the head, when the FRP member f1 is provided on the crown, the thickness of the FRP member f1 is particularly preferably less than or equal to 0.8 mm. In view of sound at impact and lowering the center of gravity of the head, when the FRP member f1 is provided on the sole, the thickness of the FRP member f1 is preferably less than or equal to 1.0 mm and preferably greater than or equal to 0.8 mm.

From the standpoint of reducing weight, the FRP member f1 has a specific gravity of preferably less than or equal to 2.0, more preferably less than or equal to 1.8, and still more preferably less than or equal to 1.7. From the standpoint of increasing fiber content and enhancing rigidity, the specific gravity of the FRP member f1 is preferably greater than or equal to 1.2, more preferably greater than or equal to 1.3, and still more preferably greater than or equal to 1.4.

A large-sized head includes a hollow portion having a large volume and a head outer shell having a small thickness. For this reason, such a large-sized head has a big sound at impact. The technique of the present disclosure is effective in heads having a big sound at impact. The head has a volume of preferably greater than or equal to 400 cc, more preferably greater than or equal to 420 cc, and still more preferably greater than or equal to 440 cc. From the standpoint of golf rules, the head volume is preferably less than or equal to 470 cc, and more preferably less than or equal to 460 cc. For large-sized heads such as a driver, the head weight is preferably set to greater than or equal to 175 g and less than or equal to 225 g.

The FRP member f1 improves the degree of freedom in weight distribution of the head, which enables to enhance a moment of inertia of the head. The head has a left-and-right moment of inertia of preferably greater than or equal to $450 \times 10^{-6}$ kg·m$^2$, and more preferably greater than or equal to $470 \times 10^{-6}$ kg·m$^2$. In view of restriction on head volume, the left-and-right moment of inertia of the head is preferably less than or equal to $590 \times 10^{-6}$ kg·m$^2$.

In the head which is in the reference state, a vertical line that passes through the center of gravity of the head and is perpendicular to the horizontal plane HP is determined. The left-and-right moment of inertia means a moment of inertia about the vertical line. The left-and-right moment of inertia can be measured by using MOMENT OF INERTIA MEASURING INSTRUMENT MODEL NO. 005-002 manufactured by INERTIA DYNAMICS.

The FRP member f1 improves the degree of freedom in weight distribution of the head, which enables to increase a depth of the center of gravity of the head. The depth of the center of gravity of the head is preferably greater than or equal to 20 mm, and more preferably greater than or equal to 22 mm. In view of restriction on head volume, the depth of the center of gravity of the head is preferably less than or equal to 40 mm, and more preferably less than or equal to 35 mm. The depth of the center of gravity of the head in the present application means the shortest distance between the shaft axis line Z and the center of gravity of the head. This distance is measured along the face-back direction.

[Average Flexural Modulus of FRP Member]

In the present application, the average flexural modulus of the FRP member f1 means an average value of a flexural modulus in a 0-degree direction and a flexural modulus in a 90-degree direction. From the standpoint of sound at impact, the average flexural modulus is preferably greater than or equal to 25 GPa. When the average flexural modulus is high, the sound at impact tends to be high-pitched. A high-pitched and long-lasting sound at impact is particularly preferable.

Figure 7:
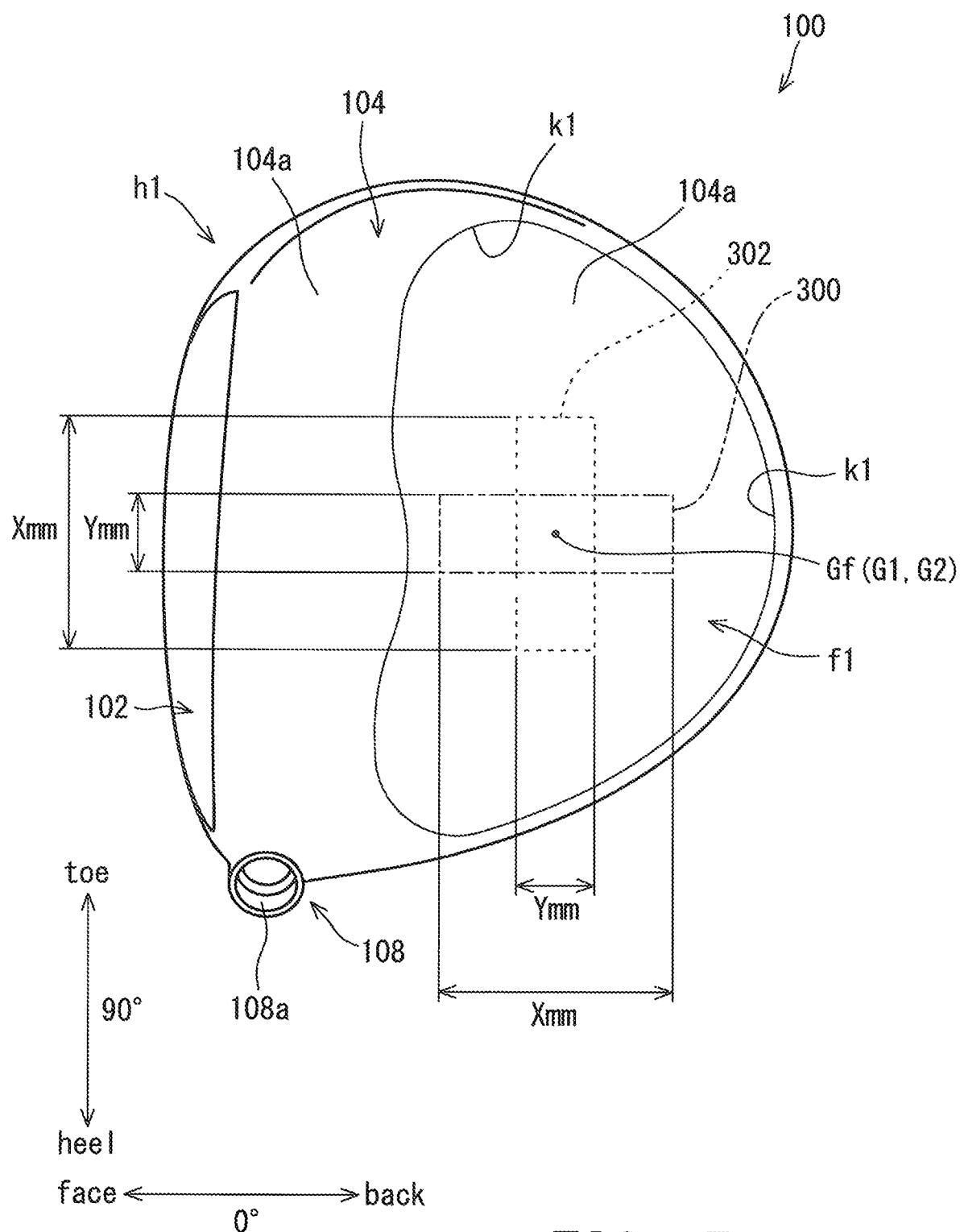
FIG. 7 is, as with FIG. 1, the plan view of the golf club head according to the first embodiment, and shows cutoff lines for cutting out test pieces to be used for measuring flexural moduli in a 0-degree direction and a 90-degree direction of the FRP member.

The flexural modulus of the FRP member f1 is measured by using test pieces that are cut out from the FRP member f1. FIG. 7 is a plan view of the head 100 and shows lines along which the test pieces are cut out. A two-dot chain line shows a line along which a test piece 300 used for measuring the flexural modulus in the 0-degree direction is cut out. A dashed line shows a line along which a test piece 302 used for measuring the flexural modulus in the 90-degree direction is cut out. The test piece 300 and the test piece 302 have the same dimensions. The average value of the flexural modulus of the test piece 300 and the flexural modulus of the test piece 302 is the average flexural modulus of the FRP member f1.

In the planar view (FIG. 7) of the head 100, the test piece 300 is a rectangle having a long side of X mm and a short side of Y mm. The long side is parallel to the face-back direction. X is greater than Y. In the planar view of the head 100, the test piece 302 is a rectangle having a long side of X mm and a short side of Y mm. The long side is parallel to the toe-heel direction. From the standpoint of stability of the FRP member f1 during measurement, X is preferably greater than or equal to 40 mm, more preferably greater than or equal to 50 mm, and still more preferably greater than or equal to 55 mm. A smooth measurement can be performed by adding a structure for preventing displacement of the test piece to a measuring jig particularly when the length X is short. The short side length Y is set to 20 mm.

A reference sign Gf in FIG. 7 shows a center of figure of the FRP member f1. The figure center Gf is the center of figure in the planar view (FIG. 7) of the head 100. A reference sign G1 in FIG. 7 shows a center of figure of the test piece 300. The figure center G1 is the center of figure in the planar view (FIG. 7) of the head 100. A reference sign G2 in FIG. 7 shows a center of figure of the test piece 302. The figure center G2 is the center of figure in the planar view (FIG. 7) of the head 100. The test piece 300 is cut out such that the figure center G1 of the test piece 300 coincides with the figure center Gf of the FRP member f1. The test piece 302 is cut out such that the figure center G2 of the test piece 302 coincides with the figure center Gf of the FRP member f1. At least two heads are needed for preparing the test piece 300 and the test piece 302.

The locations and dimensions of the lines along which the test pieces are cut out are determined in the plan view (planar view) of the head 100, such as FIG. 7. When the FRP member is located on the sole, the locations and dimensions of the lines along which the test pieces are cut out are determined in a bottom view (planar view), such as FIG. 6. When the FRP member extends from the crown into the sole, the locations and dimensions of the lines along which the test pieces are cut out are determined in a figure having a larger area of the FRP member between the plan view and the bottom view of the head.

Figure 8A:
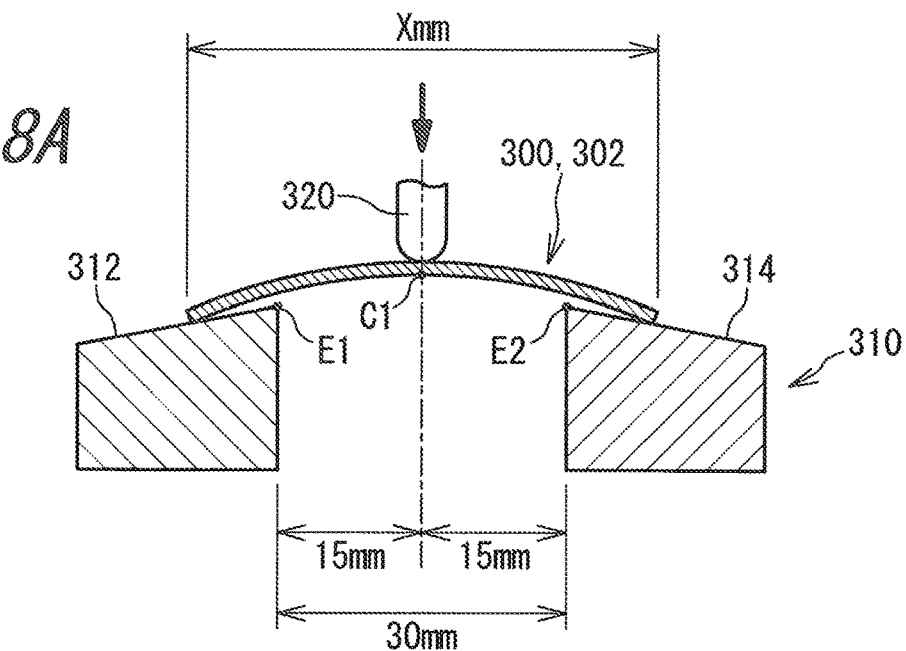
FIG. 8A, FIG. 8B and FIG. 8C are diagrams illustrating the process of measuring the flexural modulus of the FRP member.
Figure 8B:
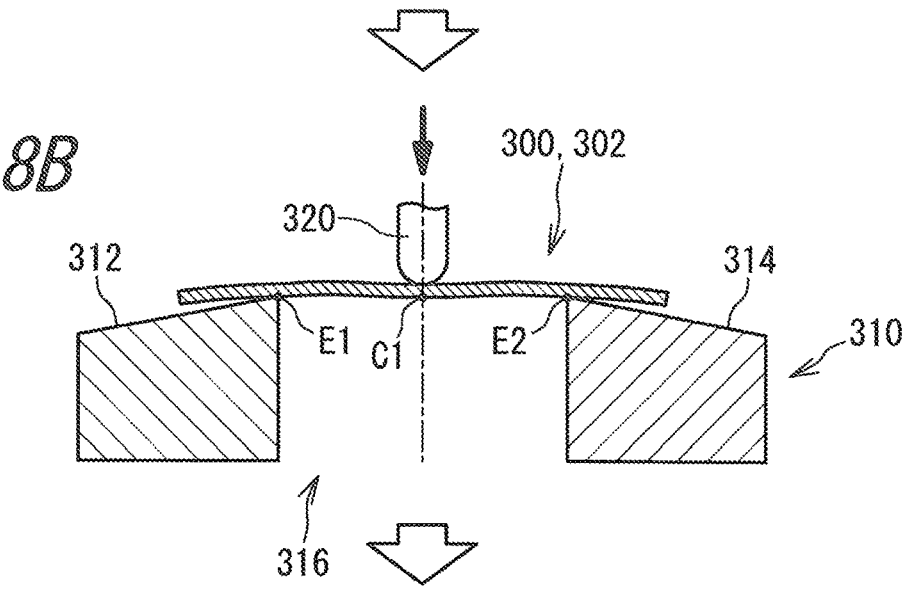
Figure 8C:
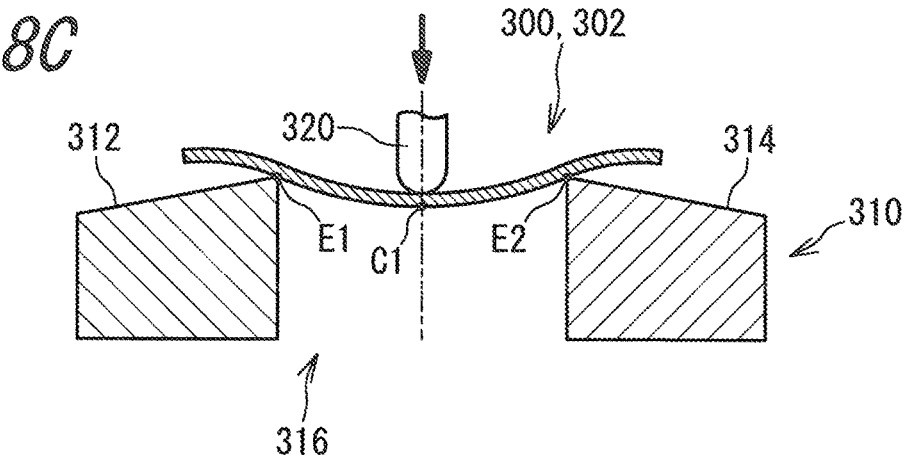

FIG. 8A, FIG. 8B and FIG. 8C are sectional views showing the process of measuring the flexural modulus of the FRP member f1. As shown in FIG. 8A, the test piece 300 or the test piece 302 is placed on a measuring jig 310 for the measurement. The measuring jig 310 includes a first supporting edge E1, a second supporting edge E2, a first upper surface 312, a second upper surface 314, and a gap 316. The first supporting edge E1 is horizontal, and the second supporting edge E2 is also horizontal. The first supporting edge E1 is parallel to the second supporting edge E2. The first supporting edge E1 and the second supporting edge E2 have the same height (same location in the vertical direction). The gap 316 is located between the first upper surface 312 and the second upper surface 314. The gap 316 is located between the first supporting edge E1 and the second supporting edge E2. The first supporting edge E1 is an edge of the first upper surface 312 and faces the gap 316. The second supporting edge E2 is an edge of the second upper surface 314 and faces the gap 316. The first upper surface 312 is inclined so as to go downward in the vertical direction as going away from the gap 316. The second upper surface 314 is inclined so as to go downward in the vertical direction as going away from the gap 316. The first supporting edge E1 and the second supporting edge E2 are vertexes of acute angles. As shown in FIG. 8A, the gap 316 has a width of 30 mm. This width is measured along a direction (hereinafter referred to as a gap direction) of a straight line that is horizontal and perpendicular to the first supporting edge E1 and the second supporting edge E2. Each of the test pieces 300 and 302 is placed so that its figure center G1 or G2 coincides with the center of the gap 316 in the gap direction.

Sectional shapes of the first supporting edge E1 and the second supporting edge E2 have a roundness. The roundness has a curvature radius of 1.5 mm.

Each of the test pieces 300 and 302 is placed so that its long sides are parallel to the gap direction when viewed from above. Therefore, the short sides of each test piece 300, 302 are parallel to the first supporting edge E1 and the second supporting edge E2 when viewed from above. Each test piece 300, 302 is aligned so that its figure center G1 or G2 coincides with the center of the gap 316. As shown in FIG. 8A, before the test is started, each test piece 300, 302 can be a state in which the test piece is not brought into contact with the first supporting edge E1 or the second supporting edge E2.

Each test piece 300, 302 is pressed downward in the vertical direction by using an indenter 320. The location of the indenter 320 coincides with the center of the gap 316 in the gap direction. The indenter 320 has a convex-shaped tip end. In a cross section that is parallel to the gap direction, the shape of the tip end of the indenter 320 is a convex line having a curvature radius of 4 mm. In a cross section that is perpendicular to the gap direction, the shape of the tip end of the indenter 320 is a straight line. The straight line is a set of vertexes of the tip end of the indenter 320 and is parallel to the first supporting edge E1 and the second supporting edge E2. The tip end of the indenter 320 abuts against each test piece 300, 302.

The indenter 320 is moved downward in the vertical direction at a speed of 5 mm/min to obtain a stress-strain curve.

As the move of the indenter 320 progresses, a lower-surface reference point C1 of the test piece 300 or 302 is gradually lowered. The lower-surface reference point C1 means a point that is present on the lower surface (inner surface) of the test piece and located at a lowermost point on the back side of an indenter contacting region. Of the upper surface of the test piece, a region that is brought into contact with the indenter 320 is referred to as the indenter contacting region. Of the lower surface of the test piece, a region located downward in the vertical direction of the indenter contacting region is referred to as the back side of the indenter contacting region.

The move of the indenter 320 moves the lower-surface reference point C1 to as low as the height of the first supporting edge E1 and the second supporting edge E2. This position of the indenter 320 is defined as a reference position. A stress when the indenter 320 is lowered by 0.1 mm from the reference point is denoted by $\sigma 1$ (MPa), a strain at this position is denoted by $\varepsilon 1$, a stress when the strain is increased by 0.2% from the strain $\varepsilon 1$ is denoted by $\sigma 2$, a strain at this position is denoted by $\varepsilon 2$, and the flexural modulus (GPa) is calculated by the following formula:

Flexural Modulus=$(\sigma 2-\sigma 1)/((\varepsilon 2-\varepsilon 1)\times 1000)$.

The stress σ (MPa) is calculated by the following formula:

$$\sigma=3FL/2bh^2.$$

In the above formula, F denotes a testing force (N), L denotes a span (mm) between supporting points, b denotes the width (mm) of the test piece, and h denotes the thickness (mm) of the test piece. The span L between the supporting points is 30 mm. The width b of the test piece is slightly greater than Y mm (20 mm), because the width b is measured along the curve of the test piece.

A strain ε is calculated by the following formula:

$$\varepsilon=6sh/L^2.$$

In the above formula, s denotes an amount (mm) of deformation relative to the reference position, L denotes the span (mm) between the supporting points, and h denotes the thickness (mm) of the test piece. The span L between the supporting points is 30 mm. The amount s of deformation for calculating ε1 is 0.1 mm.

[Modal Damping Ratio]

When a ball collides with a head, the head surface vibrates. The vibration of the head surface allows air to vibrate, thereby causing a sound at impact. The vibration of the head surface can be expressed by superposing a plurality of characteristic modes on each other. Each characteristic mode has a natural frequency and a shape of vibration. The shape of vibration is also referred to as a characteristic mode shape. Elements for determining a surface vibration in one characteristic mode are a characteristic mode shape, an amplitude, a natural frequency, and a modal damping ratio. The characteristic mode shape and the natural frequency can be determined by an eigenvalue analysis (modal analysis). The modal damping ratio is highly correlated with duration (period of time during which a sound continues) of sound at impact. The duration of the sound at impact can be lengthened by decreasing the modal damping ratio. The modal damping ratio can be found by experimental modal analysis.

For calculation of the modal damping ratio, a frequency response function is firstly measured. An impact hammer, an accelerometer, and an FFT analyzer are used for this measurement. Model 086E80 manufactured by PCB Piezotronics, Inc. is used as the impact hammer. Model 352B10 manufactured by PCB Piezotronics, Inc. is used as the accelerometer. Model DS2100 manufactured by ONO SOKKI CO., LTD. is used as the FFT analyzer. The impact hummer and the accelerometer are connected to the FFT analyzer. A yarn is fixed to a neck end surface of a head to hang the head with the yarn. The accelerometer is attached to a face center. The face center is a center of figure of the striking face of the head in the planar view. The impact hammer is used to hit predetermined points for applying vibration to obtain a frequency response function. The predetermined points are set on the surface of the head which includes the figure center Gf of the FRP member f1. More specifically, the predetermined points are arbitrary points, and for example, are located at: a point separated by 20 mm toward the toe side from the face center; a point separated by 20 mm toward the heel side from the face center; a point separated by 10 mm upward from the face center; a point separated by 10 mm downward from the face center; the center of the crown; and the center of the sole. The FFT analyzer is used for calculation of the frequency response function. Model DS0221 manufactured by ONO SOKKI CO., LTD. is used as an appurtenant software of the FFT analyzer.

The modal damping ratio is next calculated. The modal damping ratio is calculated based on the frequency response function. The modal damping ratio is calculated by using a method of identification of modal parameters. The method of identification of modal parameters is also referred to as curve fitting since modal parameters are determined so as to fit the curved line of the frequency response function in the method. A MDOF method (Multiple Degrees Of Freedom method) is used as the method of curve fitting. Of the MDOF method, an orthogonal polynomial is used. A modal analysis software is used for calculating the modal damping ratio. As the modal analysis software, tradename "ME'scopeVES" manufactured by Vibrant Technology, Inc. is used.

The modal damping ratio of each characteristic mode shape is identified in the modal analysis. A head can have a characteristic mode shape that has a natural frequency of greater than or equal to 3000 Hz and less than or equal to 5000 Hz. The number of the characteristic mode shapes having a natural frequency of greater than or equal to 3000 Hz and less than or equal to 5000 Hz may be one, or may be two or more. Among the one or two or more characteristic mode shapes, one characteristic mode shape that has the largest amplitude of the figure center Gf of the FRP member f1 is specified. The specified characteristic mode shape is also referred to as a specific characteristic mode shape. The frequency of the specific characteristic mode shape is referred to as a specific modal frequency. The range of 3000 to 5000 Hz is a frequency range in which a maximum peak of sound at impact of golf club heads is likely to appear. The modal damping ratio of the specific modal frequency is also referred to as a specific modal damping ratio. The duration (period of time during which a sound continues) of sound at impact can be lengthened by decreasing the specific modal damping ratio. Humans perceive a long duration of sound at impact as a long-lasting echo of the sound at impact. Such a sound at impact is excellent. From the standpoint of the duration of sound at impact, the specific modal damping ratio is preferably less than or equal to 0.6%. In view of properties of useable materials, the specific modal damping ratio can be greater than or equal to 0.1%.

[Measurement of Sound at Impact]

A head to be measured is attached to a golf club. The golf club is attached to a swing robot. The swing robot hits a teed-up ball with the golf club at a head speed of 38 m/s. The hitting point is the face center. As the golf ball, trade name "XXIO SUPER SOFT X" manufactured by SUMITOMO RUBBER INDUSTRIES, LTD. is used. A microphone is placed at a location separated by 30 cm toward the toe side from the tee to record a time-history wave form of the sound at impact. The time-history wave form is subjected to Fourier transformation by using an FFT analyzer to calculate a sound-at-impact primary frequency. Model DS-2100 manufactured by ONO SOKKI CO., LTD. is used as the FFT analyzer.

The sound-at-impact primary frequency means a lowest frequency in peak frequencies. In actual measurements, minute peaks tend to occur due to noise and the like. In this case, from the standpoint of excluding such peaks caused by noise and the like, the sound-at-impact primary frequency is selected from peaks having a sound pressure of greater than or equal to a predetermined threshold. The threshold is determined based on a sound pressure of the highest peak. The threshold can be set to [sound pressure of the highest peak—20 dB]. In actual measurements, sounds produced from the ball are also recorded. The sounds produced from the ball are normally around 1500 Hz. In this respect, peaks in the ranges of greater than or equal to 1000 Hz and less than or equal to 2000 Hz are ignored. The sound-at-impact primary frequency is highly correlated to a sound pitch that humans feel.

EXAMPLES

Example 1

A face part of a head body was formed by forging. Of the head body, apart excluding the face part was formed by lost-wax precision casting. The forged part and the casted part were welded to each other to obtain a head body having the same structure as the head body h1 of the head 100. The head body was made of a titanium alloy.

An FRP member was produced separately from the head body. Laminated prepregs were placed in a mold and then pressed and heated to obtain the FRP member. The thickness of the FRP member was 0.75 mm. The laminated constitution of Example 1 is shown in FIG. 9A. The laminated constitution had eight layers of a first layer s1 to an eighth layer s8 in order from inside. The first layer s1 was a 0-degree layer. The second layer s2 was a 90-degree layer. The third layer s3 was a 0-degree layer. The fourth layer s4 was a 90-degree layer. The fifth layer s5 was a 90-degree layer. The sixth layer s6 was a 0-degree layer. The seventh layer s7 was a 90-degree layer. The eighth layer s8 was a 0-degree layer. All the layers were formed by the same UD prepreg. The FRP member had a lamination symmetric property in fiber-orientation angles. The FRP member had a lamination symmetric property in layer thicknesses. The FRP member had a lamination symmetric property in kinds of carbon fibers. The FRP member had a lamination symmetric property in fiber contents. The FRP member had a lamination symmetric property in kinds of prepregs.

As the UD prepreg, an epoxy prepreg having a high Tg manufactured by Toray Industries, Inc. was used. This prepreg contained a carbon fiber as a reinforcing fiber. The matrix resin of the prepreg was an epoxy resin. The matrix resin had a glass transition temperature of 200° C. The carbon fiber had a tensile elastic modulus of 240 GPa. The prepreg had a resin content of 42% by weight.

The obtained FRP member was glued to an opening of a crown of the head body by using an adhesive to obtain a head having the same structure as the head 100. The head had a volume of 460 cc, a left-and-right moment of inertia of $470 \times 10^{-6}$ kg·m$^2$, and a weight of 196 g. The head had a depth of the center of gravity of 28 mm. The obtained head was attached to a tip end portion of a shaft, and a grip was attached to a butt end portion of the shaft, to obtain a golf club. Specifications and evaluation results of Example 1 are shown in below Table 1.

Example 2

Laminated prepregs were placed in a mold and then pressed and heated to form an FRP member. The thickness of the FRP member was 0.75 mm. The laminated constitution of the FRP member of Example 2 is shown in FIG. 9B. The laminated constitution had six layers of a first layer s1 to a sixth layer s6 in order from inside. The first layer s1 was a 0-degree layer. The second layer s2 was a 90-degree layer. The third layer s3 was a 0-degree layer. The fourth layer s4 was a 0-degree layer. The fifth layer s5 was a 90-degree layer. The sixth layer s6 was a 0-degree layer. All the layers were formed by the same UD prepreg. The FRP member had a lamination symmetric property in fiber-orientation angles. The FRP member had a lamination symmetric property in layer thicknesses. The FRP member had a lamination symmetric property in kinds of carbon fibers. The FRP member had a lamination symmetric property in fiber contents. The FRP member had a lamination symmetric property in kinds of prepregs.

A prepreg manufactured by Mitsubishi Chemical Corporation was used as the UD prepreg. This prepreg contained a carbon fiber as a reinforcing fiber. The matrix resin of the prepreg was an epoxy resin. The matrix resin had a glass transition temperature of 120° C. The carbon fiber had a tensile elastic modulus of 330 GPa. The prepreg had a resin content of 23% by weight.

The obtained FRP member was glued to the same head body as in Example 1 by using an adhesive to obtain a head. The head was combined with the same shaft and grip as in Example 1 to obtain a golf club. Specifications and evaluation results of Example 2 are shown in below Table 1.

Example 3

Laminated prepregs were placed in a mold and then pressed and heated to form an FRP member. The thickness of the FRP member was 0.75 mm. The laminated constitution of the FRP member of Example 3 is shown in FIG. 9B. The laminated constitution had six layers of a first layer s1 to a sixth layer s6 in order from inside. The first layer s1 was a 0-degree layer. The second layer s2 was a 90-degree layer. The third layer s3 was a 0-degree layer. The fourth layer s4 was a 0-degree layer. The fifth layer s5 was a 90-degree layer. The sixth layer s6 was a 0-degree layer. All the layers were formed by the same UD prepreg.

A prepreg manufactured by Mitsubishi Chemical Corporation was used as the UD prepreg. This prepreg contained a metallic fiber in addition to a carbon fiber as reinforcing fibers. The metallic fiber was a nickel-titanium alloy fiber. The matrix resin of the prepreg was an epoxy resin. The matrix resin had a glass transition temperature of 120° C. The carbon fiber had a tensile elastic modulus of 240 GPa. The prepreg had a resin content of 42% by weight.

The obtained FRP member was glued to the same head body as in Example 1 by using an adhesive to obtain a head. The head was combined with the same shaft and grip as in Example 1 to obtain a golf club. Specifications and evaluation results of Example 3 are shown in below Table 1.

Example 4

Laminated prepregs were placed in a mold and then pressed and heated to form an FRP member. The thickness of the FRP member was 0.75 mm. The laminated constitution of the FRP member of Example 4 is shown in FIG. 9B. The laminated constitution had six layers of a first layer s1 to a sixth layer s6 in order from inside. The first layer s1 was a 0-degree layer. The second layer s2 was a 90-degree layer. The third layer s3 was a 0-degree layer. The fourth layer s4 was a 0-degree layer. The fifth layer s5 was a 90-degree layer. The sixth layer s6 was a 0-degree layer. All the layers were formed by the same UD prepreg.

A prepreg manufactured by Mitsubishi Chemical Corporation was used as the UD prepreg. This prepreg contained a carbon fiber as a reinforcing fiber. The matrix resin of the prepreg was an epoxy resin. The matrix resin had a glass transition temperature of 120° C. The carbon fiber had a tensile elastic modulus of 240 GPa. The prepreg had a resin content of 23% by weight.

The obtained FRP member was glued to the same head body as in Example 1 by using an adhesive.

The head was combined with the same shaft and grip as in Example 1 to obtain a golf club. Specifications and evaluation results of Example 4 are shown in below Table 1.

Example 5

Laminated prepregs were placed in a mold and then pressed and heated to form an FRP member. The thickness of the FRP member was 0.75 mm. The laminated constitution of the FRP member of Example 5 is shown in FIG. 9B. The laminated constitution had six layers of a first layer s1 to a sixth layer s6 in order from inside. The first layer s1 was a 0-degree layer. The second layer s2 was a 90-degree layer. The third layer s3 was a 0-degree layer. The fourth layer s4 was a 0-degree layer. The fifth layer s5 was a 90-degree layer. The sixth layer s6 was a 0-degree layer. All the layers were formed by the same UD prepreg.

A prepreg manufactured by Mitsubishi Chemical Corporation was used as the UD prepreg. This prepreg contained a metallic fiber in addition to a carbon fiber as reinforcing fibers. The metallic fiber was a nickel-titanium alloy fiber. The matrix resin of the prepreg was an epoxy resin. The matrix resin had a glass transition temperature of 120° C. The carbon fiber had a tensile elastic modulus of 240 GPa. The prepreg had a resin content of 30% by weight.

The obtained FRP member was glued to the same head body as in Example 1 by using an adhesive to obtain a head. The head was combined with the same shaft and grip as in Example 1 to obtain a golf club. Specifications and evaluation results of Example 5 are shown in below Table 1.

Comparative Example 1

Laminated prepregs were placed in a mold and then pressed and heated to form an FRP member. The thickness of the FRP member was 0.75 mm. The laminated constitution had five layers of a first layer s1 to a fifth layer s5 in order from inside. The first layer s1 was a 0-degree layer. The second layer s2 was a 90-degree layer. The third layer s3 was a 0-degree layer. The fourth layer s4 was a 90-degree layer. The fifth layer s5 was a 0-degree layer. All the layers were formed by the same UD prepreg.

A prepreg manufactured by Mitsubishi Chemical Corporation was used as the UD prepreg. This prepreg contained a carbon fiber as a reinforcing fiber. The matrix resin of the prepreg was an epoxy resin. The carbon fiber had a tensile elastic modulus of 240 GPa. The prepreg had a resin content of 42% by weight.

The obtained FRP member was glued to the same head body as in Example 1 by using an adhesive to obtain a head. The head was combined with the same shaft and grip as in Example 1 to obtain a golf club. Specifications and evaluation results of Comparative Example 1 are shown in below Table 1.

Comparative Example 2

Casting was performed to obtain a resin molded member made of an epoxy resin. The resin molded member had a thickness of 0.75 mm. The resin molded member had the same shape as the shape of the FRP members in Examples 1 to 6 and Comparative Example 1.

The obtained resin molded member was glued to the same head body as in Example 1 by using an adhesive to obtain a head. The head was combined with the same shaft and grip as in Example 1 to obtain a golf club. Specifications and evaluation results of Comparative Example 2 are shown in below Table 1.

Comparative Example 3

Laminated prepregs were placed in a mold and then pressed and heated to form an FRP member. The thickness of the FRP member was 0.75 mm. The laminated constitution of the FRP member of Comparative Example 3 is shown in FIG. 9B. The laminated constitution had six layers of a first layer s1 to a sixth layer s6 in order from inside. The first layer s1 was a 0-degree layer. The second layer s2 was a 90-degree layer. The third layer s3 was a 0-degree layer. The fourth layer s4 was a 0-degree layer. The fifth layer s5 was a 90-degree layer. The sixth layer s6 was a 0-degree layer. All the layers were formed by the same UD prepreg. The FRP member had a lamination symmetric property in fiber-orientation angles. The FRP member had a lamination symmetric property in layer thicknesses. The FRP member had a lamination symmetric property in kinds of carbon fibers. The FRP member had a lamination symmetric property in fiber contents. The FRP member had a lamination symmetric property in kinds of prepregs.

A prepreg manufactured by Mitsubishi Chemical Corporation was used as the UD prepreg. This prepreg contained a carbon fiber as a reinforcing fiber. The matrix resin of the prepreg was an epoxy resin. The matrix resin had a glass transition temperature of 120° C. The carbon fiber had a tensile elastic modulus of 400 GPa. The prepreg had a resin content of 42% by weight.

The obtained FRP member was glued to the same head body as in Example 1 by using an adhesive to obtain a head. The head was combined with the same shaft and grip as in Example 1 to obtain a golf club. Specifications and evaluation results of Comparative Example 3 are shown in below Table 1.

TABLE 1

Specifications and Evaluation Results of Examples and Comparative Examples

|  | Comp. Ex. 1 | Comp. Ex. 2 | Comp. Ex. 3 | Ex. 1 | Ex. 2 | Ex. 3 | Ex. 4 | Ex. 5 |
| --- | --- | --- | --- | --- | --- | --- | --- | --- |
| Carbon Fiber | contained | not contained | contained | contained | contained | contained | contained | contained |
| Tensile Elastic Modulus of Carbon Fiber (GPa) | 240 | none | 400 | 240 | 330 | 240 | 240 | 240 |
| Metallic Fiber | none | none | none | none | none | NiTi | none | NiTi |
| Kind of Matrix Resin | epoxy | epoxy | epoxy | epoxy | epoxy | epoxy | epoxy | epoxy |
| Glass Transition Temperatre (° C.) | 120 | 120 | 120 | 200 | 120 | 120 | 120 | 120 |

TABLE 1-continued

Specifications and Evaluation Results of Examples and Comparative Examples

|  | Comp. Ex. 1 | Comp. Ex. 2 | Comp. Ex. 3 | Ex. 1 | Ex. 2 | Ex. 3 | Ex. 4 | Ex. 5 |
|---|---|---|---|---|---|---|---|---|
| Resin Content (% by weight) | 42 | 100 | 42 | 42 | 23 | 42 | 23 | 30 |
| Average Flexural Modulus (GPa) | 23 | 8 | 64 | 55 | 63 | 33 | 55 | 57 |
| Specific Gravity of FRP member | 1.52 | 1.1 | 1.56 | 1.56 | 1.63 | 1.62 | 1.6 | 1.56 |
| Weight (g) of FRP member | 18.2 | 13.2 | 18.7 | 18.7 | 19.6 | 19.4 | 19.2 | 18.7 |
| Specific Modal Frequency (Hz) | 3380 | 2840 | 4540 | 4230 | 4480 | 4450 | 4380 | 4450 |
| Specific Modal Damping Ratio (%) | 0.9 | 2.4 | 1.5 | 0.32 | 0.58 | 0.26 | 0.4 | 0.22 |
| Sound-at-Impact Primary Frequency (Hz) | 3330 | 2840 | 4480 | 4150 | 4450 | 3820 | 4360 | 4250 |
| Sensuous Evaluation of Duration of Sound (against Comp. Ex. 1) | — | N | N | Y | Y | Y | Y | Y |

Measurement methods for the evaluations were as described above. Sensuous evaluations were performed such that a person standing at a location separated by 100 cm toward the toe side from the tee listened sound at impact produced by the swing robot as described in the above "[Measurement of Sound at impact]". The person determined whether the reverberation of the sound at impact sounded longer or not as compared with that of Comparative Example 1 in the sensuous evaluations. Table 1 shows results of the sensuous evaluations by using "Y" or "N", "Y" meaning that the duration of the sound at impact was longer and the reverberation of the sound at impact sounded longer than that of Comparative Example 1, and "N" meaning that the duration of the sound at impact was not longer than that of Comparative Example 1.

Note that, in Comparative Example 2, since a characteristic mode shape having a natural frequency of 3000 to 5000 Hz did not exist, a natural frequency that is nearest to 3000 to 5000 Hz is shown as its specific modal frequency in Table 1.

The FRP member of Example 1 contained the matrix resin which had a high glass transition temperature. For this reason, Example 1 had a low specific modal damping ratio. The FRP member of Example 2 contained the carbon fiber which had a high tensile elastic modulus. For this reason, Example 2 had a high sound-at-impact primary frequency, but had a slightly high specific modal damping ratio. The FRP member of Example 3 contained the metallic fiber (Ni—Ti wire). Thus, Example 3 had a low specific modal damping ratio. The FRP member of Example 4 had a low resin content as with Example 2. For this reason, Example 4 had a high specific modal frequency and a high sound-at-impact primary frequency. The tensile elastic modulus of the carbon fiber of Example 4 was lower than that of Example 2. For this reason, the specific modal damping ratio of Example 4 was lower than the specific modal damping ratio of Example 2. In Example 5, since the metallic fiber (Ni—Ti wire) was contained and the tensile elastic modulus of the fiber was low, the specific modal damping ratio was low. In Comparative Example 1, the resin content was high and the specific modal damping ratio was high. In Comparative Example 2, a reinforcing fiber was not contained and the specific modal damping ratio was high. In Comparative Example 3, the tensile elastic modulus of the carbon fiber was high and the specific modal damping ratio was high. Examples 1 to 5 had a lower specific modal damping ratio and a longer duration of sound at impact as compared with Comparative Examples 1 to 3. For this reason, the reverberation of the sound at impact in Examples 1 to 5 sounded longer than that of Comparative Example 1. Thus, Examples 1 to 5 were evaluated as having a better sound at impact than that of Comparative Example 1.

The following clauses are disclosed regarding the above-described embodiments.

[Clause 1]

A golf club head comprising:
a striking face;
a crown; and
a sole, wherein
the crown and/or the sole includes an FRP member formed by a fiber reinforced plastic that contains a fiber and a matrix resin,
the golf club head has one or more characteristic mode shapes each having a natural frequency of greater than or equal to 3000 Hz and less than or equal to 5000 Hz, and
of the one or more characteristic mode shapes, one characteristic mode shape that has a largest amplitude of a center of figure of the FRP member is defined as a specific characteristic mode shape, the specific characteristic mode shape has a frequency that is defined as a specific modal frequency, the specific modal frequency has a modal damping ratio that is defined as a specific modal damping ratio, and the specific modal damping ratio is less than or equal to 0.6%.

[Clause 2]

The golf club head according to clause 1, wherein
the fiber contains a carbon fiber, and
the carbon fiber has a tensile elastic modulus of less than or equal to 330 GPa.

[Clause 3]

The golf club head according to clause 1 or 2, wherein
the fiber contains a metallic fiber.

[Clause 4]

The golf club head according to any one of clauses 1 to 3, wherein
the FRP member has a resin content of less than or equal to 40% by weight.

[Clause 5]

The golf club head according to any one of clauses 1 to 4, wherein
the matrix resin has a glass transition temperature of higher than or equal to 150° C.

[Clause 6]

The golf club head according to any one of clauses 1 to 5, wherein
the head has a weight of greater than or equal to 175 g and less than or equal to 225 g,
the head has a volume of greater than or equal to 400 cc, and
the head has a left-and-right moment of inertia of greater than or equal to $450 \times 10^{-6}$ kg·m².

[Clause 7]

The golf club head according to any one of clauses 1 to 6, wherein
the FRP member has a weight of less than or equal to 20 g.

[Clause 8]

The golf club head according to any one of clauses 1 to 7, wherein
the FRP member is provided on the crown, and
the FRP member has a thickness of less than or equal to 0.8 mm.

[Clause 9]

The golf club head according to any one of clauses 1 to 8, wherein
the FRP member is provided on the crown, and
the head has a depth of a center of gravity of greater than or equal to 20 mm.

[Clause 10]

The golf club head according to any one of clauses 1 to 7, wherein
the FRP member is provided on the sole, and
the FRP member has a thickness of less than or equal to 1.0 mm.

The above description is merely illustrative and various modifications can be made without departing from the principles of the present disclosure.

What is claimed is:

1. A golf club head comprising:
   a striking face;
   a crown; and
   a sole, wherein
   the crown and/or the sole includes an FRP member formed by a fiber reinforced plastic that contains a fiber and a matrix resin, the fiber including a metallic fiber and a carbon fiber having a tensile elastic modulus less than 234 GPa,
   the golf club head has one or more characteristic mode shapes each having a natural frequency of greater than or equal to 3000 Hz and less than or equal to 5000 Hz, and
   of the one or more characteristic mode shapes, one characteristic mode shape that has a largest amplitude of a center of figure of the FRP member is defined as a specific characteristic mode shape, the specific characteristic mode shape has a frequency that is defined as a specific modal frequency, the specific modal frequency has a modal damping ratio that is defined as a specific modal damping ratio, and the specific modal damping ratio is less than or equal to 0.6%.

2. The golf club head according to claim 1, wherein the FRP member has a resin content of less than or equal to 40% by weight.

3. The golf club head according to claim 1, wherein the matrix resin has a glass transition temperature of higher than or equal to 150° C.

4. The golf club head according to claim 1, wherein the golf club head has a weight of greater than or equal to 175 g and less than or equal to 225 g,
the golf club head has a volume of greater than or equal to 400 cc, and
the golf club head has a left-and-right moment of inertia of greater than or equal to $450 \times 10^{-6}$ kg·m2.

5. The golf club head according to claim 1, wherein the FRP member has a weight of less than or equal to 20 g.

6. The golf club head according to claim 1, wherein the FRP member is provided on the crown, and
the FRP member has a thickness of less than or equal to 0.8 mm.

7. The golf club head according to claim 1, wherein the FRP member is provided on the crown, and
the golf club head has a depth of a center of gravity of greater than or equal to 20 mm.

8. The golf club head according to claim 1, wherein the FRP member is provided on the sole, and
the FRP member has a thickness of less than or equal to 1.0 mm.

9. The golf club head according to claim 1, wherein the golf club head further comprises a head body that includes an opening and is made of a metal,
the opening is disposed in the crown or the sole, or extends from the sole into the crown, and
the FRP member covers the opening.

10. The golf club head according to claim 9, wherein the FRP member has a resin content of less than or equal to 40% by weight.

11. The golf club head according to claim 10, wherein the matrix resin has a glass transition temperature of higher than or equal to 150° C.

12. The golf club head according to claim 1, wherein the carbon fiber has a tensile elastic modulus greater than or equal to 30 GPa.

13. The golf club head according to claim 1, wherein the carbon fiber has a tensile elastic modulus greater than or equal to 50 GPa.

14. The golf club head according to claim 1, wherein the carbon fiber has a tensile elastic modulus greater than or equal to 100 GPa.

* * * * *